(12) United States Patent
Wildermuth

(10) Patent No.: US 11,224,830 B2
(45) Date of Patent: Jan. 18, 2022

(54) CONICAL FILTER ELEMENT WITH FUNNEL DIRECTING PARTICLES TO A TRAP

(71) Applicant: MANN+HUMMEL GmbH, Ludwigsburg (DE)

(72) Inventor: Andreas Wildermuth, Marbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 335 days.

(21) Appl. No.: 16/541,387

(22) Filed: Aug. 15, 2019

(65) Prior Publication Data
US 2020/0054973 A1    Feb. 20, 2020

(30) Foreign Application Priority Data
Aug. 15, 2018  (DE) .......................... 102018119824.8

(51) Int. Cl.
| | | |
|---|---|---|
| *B01D 29/23* | (2006.01) | |
| *B01D 29/68* | (2006.01) | |
| *B01D 29/94* | (2006.01) | |
| *B01D 39/10* | (2006.01) | |
| *H01M 8/04044* | (2016.01) | |
| *H01M 8/04029* | (2016.01) | |

(52) U.S. Cl.
CPC .............. *B01D 29/23* (2013.01); *B01D 29/68* (2013.01); *B01D 29/94* (2013.01); *B01D 39/10* (2013.01); *H01M 8/04029* (2013.01); *H01M 8/04044* (2013.01); *B01D 2201/02* (2013.01); *B01D 2201/0415* (2013.01); *B01D 2239/1216* (2013.01)

(58) Field of Classification Search
None
See application file for complete search history.

(56) References Cited

U.S. PATENT DOCUMENTS

| | | | | | |
|---|---|---|---|---|---|
| 4,386 | A | * | 2/1846 | Jennison | ........................ 210/449 |
| 134,077 | A | * | 12/1872 | Large | ..................... B01D 35/26 |
| | | | | | 210/416.1 |
| 169,092 | A | * | 10/1875 | Dillon | ..................... B01D 29/23 |
| | | | | | 210/315 |

(Continued)

FOREIGN PATENT DOCUMENTS

| | | |
|---|---|---|
| DE | 10101828 A1 | 7/2002 |
| DE | 102005036664 A1 | 2/2006 |

(Continued)

*Primary Examiner* — Robert J Popovics
(74) *Attorney, Agent, or Firm* — James Hasselbeck

(57) ABSTRACT

The invention relates to a filter element (1, 31) for use as a particulate filter in a cooling circuit (100), in particular of an electrochemical energy converter, having a conical grid support structure (3, 33). The filter element features at a first axial end a supply opening (23, 49) for supplying a cooling medium to be filtered into the filter element (1, 31) and the grid support structure (3, 33) carries a filter medium (4, 34). The filter element (1, 31) has axially opposite the supply opening (23, 49) a funnel (16, 40) for axially discharging and collecting particulate impurities, and is closed at second axial end. The conical grid support (3, 33) structure tapers from the first axial end to the second axial end. An arrangement of a fuel cell (102) having a a cooling circuit (100) with the filter element is disclosed.

14 Claims, 4 Drawing Sheets

(56) References Cited

U.S. PATENT DOCUMENTS

| | | | | |
|---|---|---|---|---|
| 381,990 A * | 5/1888 | Driller | ............... | E04D 13/08 210/318 |
| 401,186 A * | 4/1889 | Love | ............... | B01D 29/11 210/254 |
| 417,127 A * | 12/1889 | Williams | ............... | B01D 35/02 210/448 |
| 427,447 A * | 5/1890 | Thomson | ............... | B01D 35/02 210/448 |
| 429,112 A * | 6/1890 | Bowden | ............... | B01D 24/12 210/277 |
| 470,192 A * | 3/1892 | Gross | ............... | 210/449 |
| 513,215 A * | 1/1894 | Strater | ............... | C12C 1/00 210/477 |
| 538,369 A * | 4/1895 | Farmer | ............... | B01D 24/12 210/283 |
| 557,075 A * | 3/1896 | Langer | ............... | B01D 29/66 210/306 |
| 584,406 A * | 6/1897 | Rowan | ............... | B01D 24/047 210/306 |
| 711,535 A * | 10/1902 | Scholl | ............... | B01D 35/02 210/433.1 |
| 730,356 A * | 6/1903 | Emond | ............... | B01D 29/05 210/306 |
| 739,621 A * | 9/1903 | Selg et al. | ............... | B01D 24/12 210/430 |
| 744,060 A * | 11/1903 | Frye | ............... | B01D 29/085 210/239 |
| 751,918 A * | 2/1904 | Jagger | ............... | B01D 35/02 210/448 |
| 763,981 A * | 7/1904 | Hupchen | ............... | B01D 33/463 210/196 |
| 769,001 A * | 8/1904 | Lawrence | ............... | E03C 1/264 4/291 |
| 938,607 A * | 11/1909 | Reed | ............... | E03C 1/264 4/291 |
| 1,022,277 A * | 4/1912 | Taack | ............... | A47L 9/1683 55/429 |
| 1,040,283 A * | 10/1912 | Crum | ............... | B01D 29/23 210/306 |
| 1,107,485 A * | 8/1914 | Bowser | ............... | B01D 21/26 210/304 |
| 1,115,016 A * | 10/1914 | Pheils | ............... | B65F 1/1447 220/484 |
| 1,144,306 A * | 6/1915 | Mock | ............... | F01N 1/12 181/279 |
| 1,192,134 A * | 7/1916 | Setevens | ............... | G01F 23/58 73/306 |
| 1,225,993 A * | 5/1917 | Mullaney | ............... | B01D 35/0276 210/299 |
| 1,389,401 A * | 8/1921 | Van | ............... | B01D 29/15 210/484 |
| 1,436,294 A * | 11/1922 | Scott | ............... | B60K 15/0406 210/473 |
| 1,458,464 A * | 6/1923 | Byers | ............... | B01D 35/02 210/445 |
| 1,471,807 A * | 10/1923 | Roosevelt et al. | ............... | B01D 29/114 210/304 |
| 1,573,067 A * | 2/1926 | Holland | ............... | E04D 13/0409 210/463 |
| 1,585,418 A * | 5/1926 | Rosenberg | ............... | B01D 35/02 210/485 |
| 1,590,128 A * | 6/1926 | Staples | ............... | B01D 29/35 210/423 |
| 1,704,634 A * | 3/1929 | Snider | ............... | B01D 35/02 210/445 |
| 1,782,531 A * | 11/1930 | Fokker | ............... | B01D 29/117 210/407 |
| 1,804,836 A * | 5/1931 | Loranger | ............... | F25B 43/003 62/474 |
| 1,832,776 A * | 11/1931 | Hudson | ............... | B01D 35/02 210/94 |
| 1,835,429 A * | 12/1931 | Rice | ............... | B01D 35/02 210/445 |
| 1,931,988 A * | 10/1933 | Hromadka | ............... | B01D 35/02 210/306 |
| 1,933,409 A * | 10/1933 | Berman | ............... | B01D 21/02 210/94 |
| 1,950,254 A * | 3/1934 | Lien | ............... | B01D 29/11 210/306 |
| 1,961,498 A * | 6/1934 | Krueger | ............... | F16L 55/24 210/305 |
| 1,971,120 A * | 8/1934 | Rice | ............... | F16L 35/00 210/445 |
| 1,987,847 A * | 1/1935 | Flood | ............... | B01D 27/08 210/167.32 |
| 1,991,644 A * | 2/1935 | Wolters | ............... | B01D 35/16 210/312 |
| 1,992,472 A * | 2/1935 | Craig | ............... | B01D 35/02 210/305 |
| 2,019,094 A * | 10/1935 | Rice | ............... | B01D 35/02 210/445 |
| 2,028,520 A * | 1/1936 | Phillips | ............... | B01D 29/117 210/300 |
| 2,068,837 A * | 1/1937 | Aronson | ............... | F16L 55/24 210/314 |
| 2,068,858 A * | 1/1937 | Jones | ............... | B01D 46/0012 55/482 |
| 2,070,201 A * | 2/1937 | Geary | ............... | B01D 21/283 210/748.01 |
| 2,095,407 A * | 10/1937 | Baucom | ............... | F01P 11/06 210/441 |
| 2,237,964 A * | 4/1941 | Haught | ............... | B01D 29/117 210/333.1 |
| 2,247,040 A * | 6/1941 | Whitsett | ............... | A47J 37/1223 210/238 |
| 2,384,057 A * | 9/1945 | Wetherell | ............... | F28F 19/01 210/489 |
| 2,427,320 A * | 9/1947 | Zech | ............... | B01D 29/117 210/232 |
| 2,465,404 A * | 3/1949 | Sonntag | ............... | B01D 35/04 210/390 |
| 2,491,796 A * | 12/1949 | Baume | ............... | B01D 35/02 210/448 |
| 2,505,305 A * | 4/1950 | Schaefer | ............... | E03C 1/264 4/289 |
| 2,640,789 A * | 6/1953 | Hausner | ............... | C23C 18/38 427/247 |
| 2,647,636 A * | 8/1953 | Rafferty | ............... | B01D 35/023 210/238 |
| 2,658,625 A * | 11/1953 | Rafferty | ............... | F16L 55/24 210/445 |
| 2,730,242 A * | 1/1956 | Burnette | ............... | B01D 33/39 210/354 |
| 2,732,946 A * | 1/1956 | Schaub | ............... | B05B 15/00 210/459 |
| 2,733,775 A * | 2/1956 | Dupure | ............... | B01D 35/023 210/348 |
| 2,779,478 A * | 1/1957 | Wahlin | ............... | B21B 45/08 210/232 |
| 2,797,704 A * | 7/1957 | McDermott | ............... | F16K 15/063 137/543.19 |
| 2,893,563 A * | 7/1959 | Bottum | ............... | B01D 35/02 210/448 |
| 3,109,459 A * | 11/1963 | Lee, II | ............... | G05D 7/0186 138/40 |
| 3,179,253 A * | 4/1965 | McNeal | ............... | F16L 55/24 210/315 |
| 3,229,456 A * | 1/1966 | Gratzmuller | ............... | F01P 11/02 123/41.01 |
| 3,245,540 A * | 4/1966 | Johnson | ............... | B01D 24/4626 210/291 |
| 3,280,982 A * | 10/1966 | Barto | ............... | B01D 29/114 210/315 |
| 3,305,093 A * | 2/1967 | Brubaker | ............... | B01D 29/15 210/108 |
| 3,317,042 A * | 5/1967 | Botstiber | ............... | B01D 29/118 210/86 |

(56) References Cited

U.S. PATENT DOCUMENTS

| | | | | |
|---|---|---|---|---|
| 3,322,282 A | * | 5/1967 | Lyman | A47L 15/4206 210/137 |
| 3,332,557 A | * | 7/1967 | Pall | B01D 29/23 210/495 |
| 3,374,673 A | * | 3/1968 | Trageser | G01F 1/44 73/204.21 |
| 3,392,842 A | * | 7/1968 | Anderson | B01D 35/28 210/411 |
| 3,450,207 A | * | 6/1969 | Hirsch | E21B 43/086 166/233 |
| 3,474,911 A | * | 10/1969 | Olsen | B01D 37/02 210/318 |
| 3,481,475 A | * | 12/1969 | Domenech | F16L 55/24 210/304 |
| 3,592,768 A | * | 7/1971 | Parker | F16L 19/05 210/495 |
| 3,622,006 A | * | 11/1971 | Brunner | B01D 35/14 210/355 |
| 3,665,526 A | * | 5/1972 | Hoffman | A47K 1/14 4/287 |
| 3,682,308 A | * | 8/1972 | Moon | B01D 35/153 210/136 |
| 3,726,262 A | * | 4/1973 | Moon | F01P 11/02 123/41.1 |
| 3,731,815 A | * | 5/1973 | Collingwood | B01D 35/023 210/496 |
| 3,746,595 A | * | 7/1973 | Leason | B01D 29/15 156/245 |
| 3,762,564 A | * | 10/1973 | Weedon | B01D 29/58 210/446 |
| 3,794,180 A | * | 2/1974 | Blocker | B01D 35/02 210/445 |
| 3,825,124 A | * | 7/1974 | Davis | B01D 33/27 210/330 |
| 3,841,489 A | * | 10/1974 | Combest | F02M 27/045 210/223 |
| 3,872,012 A | * | 3/1975 | Endicott | B01D 29/90 210/297 |
| 3,890,235 A | * | 6/1975 | Davis | B01D 33/48 210/330 |
| 3,912,638 A | * | 10/1975 | Beaubien | B01D 29/085 210/455 |
| 3,941,697 A | * | 3/1976 | Johnson | B01D 35/02 210/167.32 |
| 3,992,886 A | * | 11/1976 | Scott | E02B 13/00 405/36 |
| 4,003,836 A | * | 1/1977 | Stearns | B01D 29/58 210/247 |
| 4,033,872 A | * | 7/1977 | Mori | B01D 35/027 210/167.04 |
| 4,052,308 A | * | 10/1977 | Higgs | B01D 35/02 210/167.32 |
| 4,052,315 A | * | 10/1977 | Lindsay, Jr. | B01D 29/111 210/232 |
| 4,057,968 A | * | 11/1977 | Scott | E02B 13/00 405/36 |
| 4,130,622 A | * | 12/1978 | Pawlak | B01D 29/111 264/255 |
| 4,135,899 A | * | 1/1979 | Gauer | B01D 46/0024 210/338 |
| 4,149,974 A | * | 4/1979 | Bolton | B01D 35/02 210/441 |
| 4,169,795 A | * | 10/1979 | Raines | B01D 29/23 210/433.1 |
| 4,198,220 A | * | 4/1980 | Keller | B01D 45/06 55/442 |
| 4,207,631 A | * | 6/1980 | Baggey | E03C 1/264 4/286 |
| 4,271,016 A | * | 6/1981 | Albertson | F01P 11/06 210/167.01 |
| 4,278,455 A | * | 7/1981 | Nardi | B01D 46/0024 210/323.2 |
| 4,287,067 A | * | 9/1981 | Dyner | B01D 29/117 165/119 |
| 4,333,826 A | * | 6/1982 | Albertson | F01P 11/06 210/167.01 |
| 4,343,353 A | * | 8/1982 | Tsopelas | F01P 11/06 123/41.08 |
| 4,413,675 A | * | 11/1983 | Gano | F01P 11/06 123/41.15 |
| 4,418,722 A | * | 12/1983 | Kendall | B01J 3/02 138/42 |
| 4,460,469 A | * | 7/1984 | Francesconi, Jr. | B01D 29/96 210/447 |
| 4,469,594 A | * | 9/1984 | Poetter | B01D 35/12 210/108 |
| 4,495,073 A | * | 1/1985 | Beimgraben | E21B 21/002 166/227 |
| 4,500,332 A | * | 2/1985 | Gillingham | B01D 45/06 55/332 |
| 4,550,896 A | * | 11/1985 | Hansen, III | B01D 35/04 137/377 |
| 4,582,605 A | * | 4/1986 | Rea | B01D 29/33 210/447 |
| 4,608,166 A | * | 8/1986 | Cain | B01D 29/111 210/232 |
| 4,640,771 A | * | 2/1987 | Whalen | B01D 29/15 210/167.01 |
| 4,702,754 A | * | 10/1987 | Blocker | B01D 46/0012 137/223 |
| 4,725,364 A | * | 2/1988 | Hurley | B01D 29/115 210/497.3 |
| 4,743,369 A | * | 5/1988 | Geermans | B01D 29/27 210/167.29 |
| 4,758,256 A | * | 7/1988 | Machado | B01D 46/0005 210/232 |
| 4,788,943 A | * | 12/1988 | Hayashi | F01P 3/2285 123/41.21 |
| 4,801,094 A | * | 1/1989 | Gonzalez | B01D 29/33 239/553.3 |
| 4,839,038 A | * | 6/1989 | McLain, II | B01D 29/111 210/137 |
| 4,849,105 A | * | 7/1989 | Borchert | B01D 29/33 210/408 |
| 4,860,805 A | * | 8/1989 | Townsend | A47C 27/085 141/382 |
| 4,861,478 A | * | 8/1989 | Hall | B01D 29/35 210/416.4 |
| 4,882,055 A | * | 11/1989 | Stamstad | B01D 29/111 210/483 |
| 4,894,156 A | * | 1/1990 | Murken | B01D 29/15 210/448 |
| 4,949,682 A | * | 8/1990 | Klein | F01P 11/06 123/41.15 |
| 4,995,452 A | * | 2/1991 | Franck | F01P 11/06 123/41.27 |
| 5,011,023 A | * | 4/1991 | Arai | B01D 29/48 209/400 |
| 5,025,946 A | * | 6/1991 | Butkovich | B60K 15/0403 220/86.3 |
| 5,132,013 A | * | 7/1992 | Thompson | B01D 29/6438 210/448 |
| 5,197,455 A | * | 3/1993 | Tessien | A47J 37/079 126/144 |
| 5,252,204 A | * | 10/1993 | Chiodo | B01D 29/111 210/232 |
| 5,266,194 A | * | 11/1993 | Chiodo | B01D 29/111 210/232 |
| 5,269,824 A | * | 12/1993 | Takita | B01D 46/2403 55/385.1 |
| 5,279,264 A | * | 1/1994 | Simmons | F01P 7/16 123/41.1 |
| 5,281,331 A | * | 1/1994 | Golan | B01D 35/02 123/41.04 |
| 5,300,224 A | * | 4/1994 | Farley | C02F 1/003 210/266 |
| 5,382,355 A | * | 1/1995 | Arlozynski | B01D 27/101 210/85 |

(56) References Cited

U.S. PATENT DOCUMENTS

| | | | | |
|---|---|---|---|---|
| 5,417,906 A * | 5/1995 | Chiodo | B01D 29/111 | 264/153 |
| 5,490,868 A * | 2/1996 | Whitlock | B01D 46/0012 | 55/503 |
| 5,492,143 A * | 2/1996 | Cooper | B01D 29/117 | 137/15.01 |
| 5,500,115 A * | 3/1996 | Nehm | E03C 1/08 | 210/460 |
| 5,536,402 A * | 7/1996 | Kluhsman | B01D 29/35 | 210/232 |
| 5,545,318 A * | 8/1996 | Richmond | B01D 29/15 | 210/232 |
| 5,588,635 A * | 12/1996 | Hartman | F15D 1/04 | 138/44 |
| 5,662,791 A * | 9/1997 | Hurst | B01D 35/02 | 210/167.01 |
| 5,717,137 A * | 2/1998 | Singleterry | B01D 29/117 | 73/239 |
| 5,718,281 A * | 2/1998 | Bartalone | F01P 11/029 | 165/41 |
| 5,820,715 A * | 10/1998 | Singleterry | B01D 29/117 | 156/73.1 |
| 5,888,260 A * | 3/1999 | Sica | B01D 46/0012 | 55/331 |
| 5,897,787 A * | 4/1999 | Keller | B01D 29/35 | 210/767 |
| 5,916,435 A * | 6/1999 | Spearman | B01D 29/23 | 210/132 |
| 5,972,059 A * | 10/1999 | Morgan | B01D 46/002 | 55/336 |
| 6,000,433 A * | 12/1999 | Carroll | F15B 11/044 | 138/41 |
| 6,132,483 A * | 10/2000 | Andrews | B01D 46/10 | 55/385.1 |
| 6,149,703 A * | 11/2000 | Parker | F02M 21/0227 | 55/502 |
| 6,196,301 B1 * | 3/2001 | Sabin | F28D 9/00 | 165/119 |
| 6,267,881 B1 * | 7/2001 | Covington | B01D 29/016 | 210/167.32 |
| 6,352,645 B1 * | 3/2002 | Wilfong | B01D 29/15 | 210/767 |
| 6,402,962 B1 * | 6/2002 | Bruntz | B01D 35/02 | 210/739 |
| 6,455,818 B1 * | 9/2002 | Arntz | F24C 15/2042 | 126/299 R |
| 6,458,303 B1 * | 10/2002 | Fuehrer | B01D 29/071 | 264/153 |
| 6,461,506 B1 * | 10/2002 | Bradford | B01D 29/94 | 210/309 |
| 6,468,427 B1 * | 10/2002 | Frey | A61M 1/3627 | 210/497.01 |
| 6,487,729 B2 * | 12/2002 | Delanzo | E03C 1/264 | 4/286 |
| 6,494,325 B1 * | 12/2002 | Mizrahi | B01D 35/02 | 137/550 |
| 6,540,806 B2 * | 4/2003 | Reinhold | B01D 46/2414 | 55/490 |
| 6,619,331 B1 * | 9/2003 | Suchdev | F01P 11/04 | 138/109 |
| 6,620,223 B2 * | 9/2003 | Bloomer | B01D 46/0005 | 55/490 |
| 6,722,508 B2 * | 4/2004 | Parker | B01D 29/111 | 210/448 |
| 6,766,825 B2 * | 7/2004 | Antunez | F16K 31/3855 | 137/315.08 |
| 6,808,552 B2 * | 10/2004 | Borla | B01D 46/2403 | 210/448 |
| 6,810,683 B2 * | 11/2004 | Eustice | F25B 41/31 | 62/296 |
| 6,833,023 B1 * | 12/2004 | Vandenberghe | B01D 29/906 | 55/337 |
| 6,836,963 B2 * | 1/2005 | Wnuk | B01D 29/111 | 29/896.61 |
| 6,939,465 B2 * | 9/2005 | Dupre | B01D 35/02 | 210/248 |
| 6,949,214 B2 * | 9/2005 | Frey | A61M 1/3627 | 264/328.1 |
| 6,955,266 B2 * | 10/2005 | Ballet | B01D 29/117 | 210/409 |
| 6,994,738 B2 * | 2/2006 | Taddey | B01D 45/04 | 55/306 |
| 7,063,783 B2 * | 6/2006 | Ballet | B01D 29/117 | 210/181 |
| 7,105,090 B2 * | 9/2006 | Choo | A01K 63/045 | 210/333.1 |
| 7,176,034 B2 * | 2/2007 | Efthimiadis | A61B 10/0051 | 422/534 |
| 7,282,140 B2 * | 10/2007 | Boast | B01D 35/0273 | 210/130 |
| 7,347,223 B2 * | 3/2008 | Richter | F15D 1/02 | 138/118 |
| 7,376,983 B1 * | 5/2008 | Sciarrino | E03C 1/264 | 4/288 |
| RE40,481 E * | 9/2008 | Borla | B01D 46/2403 | 210/448 |
| 7,473,359 B1 * | 1/2009 | Barrett, II | B01D 29/35 | 134/168 C |
| 7,510,084 B2 * | 3/2009 | Bishop | B07B 7/06 | 209/309 |
| 7,615,148 B1 * | 11/2009 | Gentry | B01D 35/02 | 210/170.07 |
| 7,694,942 B1 * | 4/2010 | Genera | F28F 19/01 | 261/3 |
| 7,730,907 B2 * | 6/2010 | Richter | F15D 1/02 | 138/37 |
| 7,828,870 B1 * | 11/2010 | Rech | B01D 46/2411 | 55/498 |
| 7,832,567 B2 * | 11/2010 | Joseph | B01D 29/15 | 210/473 |
| 7,875,178 B2 * | 1/2011 | Ashliman | B01D 24/12 | 210/323.1 |
| 8,038,872 B2 * | 10/2011 | Jokschas | B01D 35/18 | 210/86 |
| 8,038,878 B2 * | 10/2011 | Hewkin | F01P 11/06 | 210/167.32 |
| 8,083,940 B2 * | 12/2011 | Durocher | B01D 35/02 | 210/232 |
| 8,114,278 B2 * | 2/2012 | Lorente | B01D 36/001 | 210/188 |
| 8,182,702 B2 * | 5/2012 | Al-Sannaa | B01D 46/0012 | 210/806 |
| 8,202,495 B1 * | 6/2012 | Smith | B01L 3/0275 | 422/524 |
| 8,231,779 B2 * | 7/2012 | Jokschas | B01D 35/18 | 210/86 |
| 8,282,700 B2 * | 10/2012 | Walz | F16L 37/0847 | 55/503 |
| 8,377,295 B2 * | 2/2013 | Strassenberger | B01D 35/30 | 210/186 |
| 8,404,015 B2 * | 3/2013 | Moser | B01D 46/08 | 55/385.3 |
| 8,500,672 B2 * | 8/2013 | Caleffi | A61M 1/3627 | 604/6.09 |
| 8,501,012 B2 * | 8/2013 | Himmel | B01D 35/02 | 210/741 |
| 8,534,467 B2 * | 9/2013 | Haas | F16L 55/24 | 210/459 |
| 8,557,200 B1 * | 10/2013 | Smith | B01L 3/0275 | 422/524 |
| 8,641,657 B2 * | 2/2014 | Ribolzi | A61M 1/3627 | 604/7 |
| 8,641,892 B2 * | 2/2014 | Winther | B01D 35/02 | 210/155 |
| 8,707,855 B2 * | 4/2014 | DeMiglio | A47J 31/0689 | 99/279 |
| 8,858,795 B2 * | 10/2014 | McLane | B01D 35/22 | 210/304 |

(56) References Cited

U.S. PATENT DOCUMENTS

| | | | |
|---|---|---|---|
| 9,142,843 B2* | 9/2015 | Beylich | B01J 47/024 |
| 9,194,343 B2* | 11/2015 | Thienel | F02M 37/24 |
| 9,238,187 B2* | 1/2016 | Kawaguchi | B01D 29/15 |
| 9,421,481 B2* | 8/2016 | Sakraschinsky | B01D 29/52 |
| 9,427,685 B2* | 8/2016 | Pekarsky | B01D 35/0273 |
| 9,581,074 B2* | 2/2017 | Harkey | F01P 7/16 |
| 9,675,911 B2* | 6/2017 | Yazykov | F04B 53/20 |
| 9,808,750 B2* | 11/2017 | Klein | B01D 35/18 |
| D812,183 S * | 3/2018 | McGavin | D22/122 |
| D815,895 S * | 4/2018 | Roth | D7/400 |
| 9,982,418 B2* | 5/2018 | Bennett | E03B 7/095 |
| D820,638 S * | 6/2018 | Chitayat | D7/400 |
| 9,997,754 B2* | 6/2018 | Beylich | H01M 10/4207 |
| 10,029,132 B2* | 7/2018 | Cray | B67D 7/04 |
| 10,046,258 B2* | 8/2018 | Provenziani | B01D 35/02 |
| 10,124,281 B2* | 11/2018 | Heilman | B01D 35/153 |
| 10,293,910 B1* | 5/2019 | Torgerud | B63H 20/28 |
| 10,307,701 B2* | 6/2019 | Klein | B01D 46/4263 |
| 10,441,902 B2* | 10/2019 | Tange | B01D 29/902 |
| 10,463,999 B2* | 11/2019 | Washington | B01D 35/005 |
| 10,486,167 B2* | 11/2019 | Willigan | B03C 5/005 |
| 10,495,390 B2* | 12/2019 | Huang | F28F 1/006 |
| 10,507,419 B2* | 12/2019 | Holzmann | B01D 46/0068 |
| D873,972 S * | 1/2020 | Hayes | D23/261 |
| 10,626,707 B2* | 4/2020 | Gao | E21B 27/005 |
| 10,662,907 B2* | 5/2020 | Dirnberger | F02M 35/10262 |
| 10,688,430 B2* | 6/2020 | Holzmann | B01D 46/0082 |
| 10,744,428 B2* | 8/2020 | Wyhler | B01D 35/18 |
| 10,794,794 B2* | 10/2020 | Bowdle | G01M 9/04 |
| 10,815,141 B2* | 10/2020 | Timmons | B01D 15/00 |
| 10,858,816 B2* | 12/2020 | Montague | B01D 29/31 |
| 10,982,425 B1* | 4/2021 | Grumbach | E03C 1/264 |
| 2001/0017283 A1* | 8/2001 | Ostrowski | B01D 29/58 |
| | | | 210/806 |
| 2001/0054589 A1* | 12/2001 | Ostrowski | B01D 35/31 |
| | | | 210/767 |
| 2002/0046654 A1* | 4/2002 | Bloomer | B01D 46/523 |
| | | | 95/273 |
| 2003/0006187 A1* | 1/2003 | Frey | B01D 29/111 |
| | | | 210/497.01 |
| 2003/0178349 A1* | 9/2003 | Bacon | E04D 13/08 |
| | | | 210/94 |
| 2003/0213127 A1* | 11/2003 | Wnuk | B01D 29/48 |
| | | | 29/896.62 |
| 2004/0005246 A1* | 1/2004 | Efthimiadis | B01L 3/563 |
| | | | 422/534 |
| 2004/0011726 A1* | 1/2004 | Weh | B01D 29/48 |
| | | | 210/352 |
| 2004/0031747 A1* | 2/2004 | Dupre | B01D 35/02 |
| | | | 210/411 |
| 2004/0069704 A1* | 4/2004 | Yamaguchi | F02M 47/027 |
| | | | 210/497.01 |
| 2004/0144105 A1* | 7/2004 | Ballet | B01D 29/117 |
| | | | 62/85 |
| 2004/0255660 A1* | 12/2004 | Abdolhosseini | |
| | | | F02M 35/10386 |
| | | | 73/114.32 |
| 2005/0017019 A1* | 1/2005 | Richter | F15D 1/02 |
| | | | 222/1 |
| 2005/0023196 A1* | 2/2005 | Ku | B01D 35/02 |
| | | | 210/90 |
| 2005/0145551 A1* | 7/2005 | Ballet | B01D 35/02 |
| | | | 210/175 |
| 2007/0000279 A1* | 1/2007 | Koo | B01D 35/02 |
| | | | 62/474 |
| 2007/0125699 A1* | 6/2007 | Hendee | B01D 35/02 |
| | | | 210/452 |
| 2007/0181486 A1* | 8/2007 | Ashliman | B01D 29/23 |
| | | | 210/323.1 |
| 2007/0215226 A1* | 9/2007 | Richter | F15D 1/02 |
| | | | 138/37 |
| 2007/0221554 A1* | 9/2007 | Wright | B01D 46/0087 |
| | | | 210/120 |
| 2008/0047888 A1* | 2/2008 | Durocher | B01D 35/02 |
| | | | 210/232 |
| 2008/0191382 A1* | 8/2008 | Sato | B01D 29/111 |
| | | | 264/219 |
| 2008/0290017 A1* | 11/2008 | Farace | B01D 35/02 |
| | | | 210/234 |
| 2009/0255878 A1* | 10/2009 | Himmel | B01D 35/147 |
| | | | 210/741 |
| 2010/0116732 A1* | 5/2010 | Jung | B01D 29/114 |
| | | | 210/447 |
| 2010/0155336 A1* | 6/2010 | Simonson | F16L 55/24 |
| | | | 210/695 |
| 2010/0155345 A1* | 6/2010 | Al-Sannaa | B01D 46/4236 |
| | | | 210/806 |
| 2010/0192777 A1* | 8/2010 | Walz | F16L 55/24 |
| | | | 96/419 |
| 2010/0230356 A1* | 9/2010 | Chhoa | B01D 29/52 |
| | | | 210/663 |
| 2011/0114195 A1* | 5/2011 | Haas | B01D 29/96 |
| | | | 137/15.01 |
| 2011/0132817 A1* | 6/2011 | Gardner | B01D 29/68 |
| | | | 210/90 |
| 2011/0253644 A1* | 10/2011 | Kolp, Jr. | B01D 35/02 |
| | | | 210/767 |
| 2011/0265438 A1* | 11/2011 | Ryan | B01D 29/35 |
| | | | 55/503 |
| 2012/0148930 A1* | 6/2012 | Beylich | H01M 8/04044 |
| | | | 429/434 |
| 2012/0211410 A1* | 8/2012 | Wnuk | B01D 29/48 |
| | | | 210/323.2 |
| 2012/0241369 A1* | 9/2012 | McLane | B01D 29/58 |
| | | | 210/301 |
| 2012/0298568 A1* | 11/2012 | Winther | B01D 29/68 |
| | | | 210/162 |
| 2013/0126446 A1* | 5/2013 | Kozar | B01D 29/35 |
| | | | 210/767 |
| 2013/0206679 A1* | 8/2013 | Kawaguchi | B01D 35/02 |
| | | | 210/437 |
| 2014/0001744 A1* | 1/2014 | Haas | E03B 7/07 |
| | | | 285/5 |
| 2014/0008308 A1* | 1/2014 | Guy | B01D 29/27 |
| | | | 210/767 |
| 2014/0054236 A1* | 2/2014 | Bennett | E03B 7/095 |
| | | | 210/747.3 |
| 2014/0076794 A1* | 3/2014 | Sakraschinsky | B01D 29/52 |
| | | | 210/323.2 |
| 2014/0076795 A1* | 3/2014 | Pekarsky | B01D 35/0273 |
| | | | 210/348 |
| 2015/0021259 A1* | 1/2015 | Dirkers | B01D 29/13 |
| | | | 210/335 |
| 2015/0190741 A1* | 7/2015 | Washington | B01D 35/005 |
| | | | 141/11 |
| 2015/0209697 A1* | 7/2015 | Yazykov | F04B 53/20 |
| | | | 210/435 |
| 2015/0354242 A1* | 12/2015 | Saccoccio | E04H 4/1272 |
| | | | 210/806 |
| 2016/0059164 A1* | 3/2016 | Plickys | B01D 35/02 |
| | | | 210/131 |
| 2016/0263495 A1* | 9/2016 | Wyhler | B01D 35/18 |
| 2017/0204820 A1* | 7/2017 | Dirnberger | F02M 35/0207 |
| 2018/0001235 A1* | 1/2018 | Tange | F01N 3/2066 |
| 2018/0015484 A1* | 1/2018 | Willigan | B01D 35/005 |
| 2018/0028950 A1* | 2/2018 | Heilman | B01D 35/02 |
| 2019/0177962 A1* | 6/2019 | Montague | B01D 24/20 |
| 2020/0054973 A1* | 2/2020 | Wildermuth | B01D 29/23 |
| 2020/0406169 A1* | 12/2020 | Betcher | B01D 36/003 |
| 2021/0001251 A1* | 1/2021 | Nodomi | B01D 29/23 |
| 2021/0113951 A1* | 4/2021 | Oh | B01D 39/10 |
| 2021/0207356 A1* | 7/2021 | Grumbach | E03C 1/264 |
| 2021/0222524 A1* | 7/2021 | Nath | E21B 43/086 |

FOREIGN PATENT DOCUMENTS

| | | | | |
|---|---|---|---|---|
| DE | 102016111562 A1 | | 12/2017 | |
| DE | 102019121342 A1 * | | 2/2020 | B01D 29/68 |
| DE | 102019121342 B4 * | | 3/2021 | B01D 29/94 |

(56) References Cited

FOREIGN PATENT DOCUMENTS

| EP | 2848293 A1 | * | 3/2015 | ........... B01D 27/106 |
| EP | 2848293 B1 | * | 11/2017 | ........... B01D 27/106 |
| GB | 2507728 A | | 5/2014 | |
| GB | 2512385 A | | 10/2014 | |
| WO | WO2016200850 A1 | | 12/2016 | |

* cited by examiner

CONICAL FILTER ELEMENT WITH FUNNEL DIRECTING PARTICLES TO A TRAP

TECHNICAL FIELD

The present invention relates to a filter element for use as a particulate filter in a cooling circuit of an electrochemical energy converter and arrangement with an electrochemical energy converter and a cooling circuit. As an electrochemical energy converter, a fuel cell or several fuel cells, in particular stacked fuel cells, are particularly preferred.

BACKGROUND ART

In the field of fuel cells, particulate filters are used for filtering particulate impurities contained in the cooling medium, e.g. due to production and assembly. In doing so, the dirt in the fluid is typically filtered out of the fluid in a filter medium by a so-called depth filtration. The dirt adheres firmly both inside and on the surface of the medium to the fibers and structures located there and thus reduces the free cross-section of the medium above a certain amount of dirt, so that less flow cross-section is available for the volume flow and the pressure loss across the medium increases.

Filter elements for fuel cells with conical surfaces are well known. DE 101 01 828 B4 discloses a corresponding filter element in which, among other things, plastic non-woven fabric, cotton non-woven fabric or metallic materials with a mesh- or fabric-like structure are used as filter medium. In this case, however, the filtered particulate dirt can gradually block the filter medium.

DISCLOSURE OF THE INVENTION

Based on the afore-mentioned background art, the objective of the present invention is to provide a filter element for high flow velocities requiring little installation space and having a low pressure loss compared to the volume flow and maintaining this low pressure loss even after having accumulated a certain amount of dirt.

The present invention solves this objective by providing a filter element according to the claims.

A filter element according to the invention is suitable for use as a particulate filter in a cooling circuit of an electrochemical energy converter, in particular of a fuel cell. The cooling circuit can be part of an arrangement comprising the electrochemical energy converter.

The filter element comprises a conical grid support structure with a longitudinal axis A. As the name already suggests, the grid support structure is grid-shaped and can consist of struts in particular. The grid support structure features a supply opening at a first axial end for supplying a coolant to be filtered into the filter element. The filter element is closed at another axial end.

The filter medium is carried and preferably supported by the grid support structure. For example, the filter medium can be disposed from the inside, i.e. from the side of an interior space of the grid support structure, or from the outside at the grid support structure. The conical grid support structure tapers from the first axial end to the second axial end. In this way, an axial flow through the filter element is advantageously made possible when the filter element is mounted in a pipe of a fluid system, in particular of a cooling circuit of an electrochemical energy converter. The filter element is designed to be axially flowed through from the first axial end to the second axial end. The term "axial" in this context refers to the longitudinal axis of the filter element, which corresponds to a main flow direction in a usage arrangement.

According to the invention, the filter element features a funnel in a portion opposite the supply opening. The funnel is intended for axial discharge from the surface of the filter medium and for collecting particulate impurities.

This axial discharge of particulate impurities counteracts a pressure loss due to increasing loading of the filter medium.

The grid support structure can define a circumferential surface. The circumferential surface has a conical shape. Advantageously, the circumferential surface cannot be a closed surface but can be provided with grid windows or with windows in the grid support structure, in which a filter medium is disposed. It can be defined by struts, e.g. circumferential struts and longitudinal struts for connecting the longitudinal struts. The grid support structure can feature a filter medium along its circumferential surface or, for example at a slight distance from the circumferential surface, parallel to it.

Terminally, i.e. at a terminal end, the filter element can feature a collecting chamber for particulate impurities, in particular a dirt collecting chamber with closed wall towards the exterior side of the filter element. This collecting chamber can be designed to receive particulate impurities collected by the funnel. The collecting chamber can be advantageously and preferably limited by the funnel in combination with a terminal end cap segment of the grid support structure or with an end cap disposed on the grid support structure.

The funnel can feature a first funnel opening and a second funnel opening, the second funnel opening being smaller than the first funnel opening. The funnel can be disposed with the second funnel opening pointing towards the collecting chamber. The second funnel opening can preferably lead into this collecting chamber. This reduces the funnel cross-section towards the dirt collecting chamber, which enables a particularly good bundling of the particles separated on the filter medium and their discharge or transport into the collecting chamber.

In addition to the funnel openings, the filter element can feature a backflush opening or several backflush openings for draining medium, in particular cooling medium, from the collecting chamber. The discharge from the collection chamber can take place in particular into an interior space of the filter element or, which is preferred, by passing the filter medium to the outside, since there is no danger of a circulating backflow of particulateladen fluid.

The backflush opening or the backflush openings can be advantageously disposed at the edge of the funnel in relation to the radially outer circumferential edge of the funnel.

The filter medium can preferably be designed as a screen mesh, in particular as a metal mesh, particularly preferably as a high-grade steel screen mesh, which is mechanically particularly stable even under high temperature stress and at high flow velocities.

In order to avoid a higher dynamic pressure, it is advantageous if the average mesh width of the screen mesh is preferably more than 70 μm and preferably between 80 and 150 μm, particularly preferably between 100 and 120 μm. This size allows the separation of the particulate matter and at the same time the passage of the medium, especially the coolant.

The grid support structure, in particular a plastic grid support structure, can define an interior space for receiving a cooling medium to be filtered, the funnel being disposed in such a way that the particulate impurities can be axially discharged from the interior space.

The discharge of the particles to the collecting chamber can be advantageously supported because the filter element has a conical shape.

Additional stability at high flow velocities can be achieved by encapsulating and/or ovemolding the filter medium, in particular the screen mesh, with the material of the grid support structure. The material of the grid support structure can preferably be plastic. Typical methods for manufacturing the afore-mentioned arrangement consisting of filter medium and grid support structure are known, for example, from the fields of application of plastic injection molding.

Particularly preferably, the funnel can be a plastic component which can be designed as part of the grid support structure or as a component separated from the grid support structure.

Advantageously, the filter element can comprise at least two separate components, preferably at least the grid support structure with the filter medium and a flow guide component with the funnel. The flow guide component can thus be removed from the grid support structure or separated from it and cleaned. If the funnel limits the collecting chamber in conjunction with an end cap or end cap segment, the collecting chamber is released after removal of the funnel and can be cleaned. Thus, the filter element is advantageously reusable. Particularly preferably, the filter element should not comprise more than four components in order not to make the assembly of the filter element too complicated.

The filter element can advantageously feature an end cap segment, which can be designed in one piece with the grid support structure, preferably by providing the collecting chamber.

Alternatively, the end cap can be detachably disposed opposite the grid support structure and designed to form the collecting chamber. The filter element, in particular the collecting chamber, can thus be cleaned during maintenance, for example, by loosening the end cap without completely dismantling the filter element.

The funnel can feature one support member or several support members, preferably one or more support members disposed at the edge of the funnel, relative to the radially outer peripheral edge of the funnel. These support members can extend into the collecting chamber and be supported by the end cap or end cap segment. This can preferably be done on one or more stop surfaces formed inside the end cap or on the end cap segment. The support member or the support members can feature the backflush opening or backflush openings or can interact with the end cap and/or the end cap segment to form the backflush opening or the backflush openings.

As previously mentioned, these backflush openings can be used to return coolant from the collecting chamber to the interior space of the filter element. This improves the transport of the particles into the collecting chamber.

Advantageously, the funnel features an inlet diameter and an outlet diameter, wherein the inlet diameter can be at least 20%, preferably 25%, larger than the outlet diameter.

The funnel can feature a rounded funnel wall in its course or in its extension along the funnel axis in such a way that a convex curvature of the funnel results in the longitudinal extension of the funnel, which has fluidic advantages.

Furthermore, according to the invention is an arrangement with an electrochemical energy converter, in particular of a fuel cell, and with a cooling circuit for cooling the electrochemical energy converter by a coolant, the cooling circuit featuring the afore-mentioned filter element according to the invention, for filtering the coolant in order to remove particulate impurities from the coolant. The filter element is disposed in the cooling circuit in such a way that it can be flowed through in an axial direction. The filter element is preferably accommodated in an internal volume of at least one line of a fluid circuit, preferably of the cooling circuit for cooling the electrochemical energy converter. Due to its conical shape, the filter element does not require an accommodating area with extended cross-section to accommodate the filter element. Instead, the filter element can be easily integrated into an available continuous cross-section. The filter element is advantageously flowed through in the arrangement according to the invention in such a way that the main flow direction of the fluid circuit coincides with a taper direction of the grid support structure of the filter element from the first axial end to the second axial end, since in this case the particulate impurities are most effectively collected by the funnel.

BRIEF DESCRIPTION OF DRAWINGS

In the following, the subject of this invention is explained in more detail using several examples of an embodiment and with the aid of the accompanying figures. The examples of an embodiment shown are particularly advantageous, but are not to be understood in a restrictive way of the subject matter of the present invention. Individual features can be transferred to different variants of a filter element that are not displayed. It is shown in.

EMBODIMENT(S) OF THE INVENTION

Figure 1:
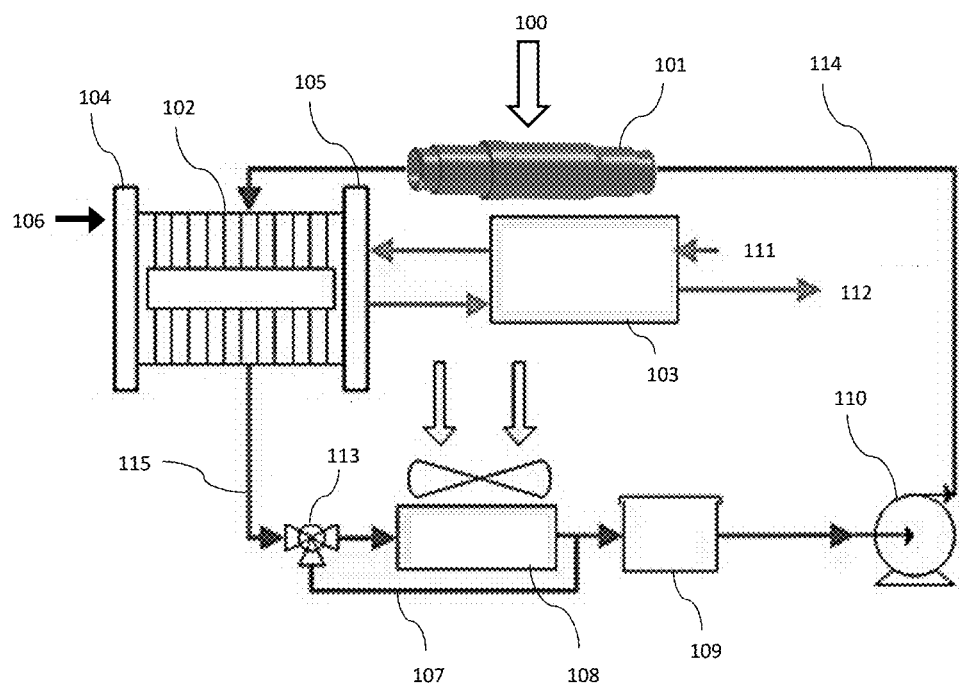
FIG. 1: a perspective representation of the cooling circuit of an electrochemical energy converter, in particular of a fuel cell.
Figure 2:
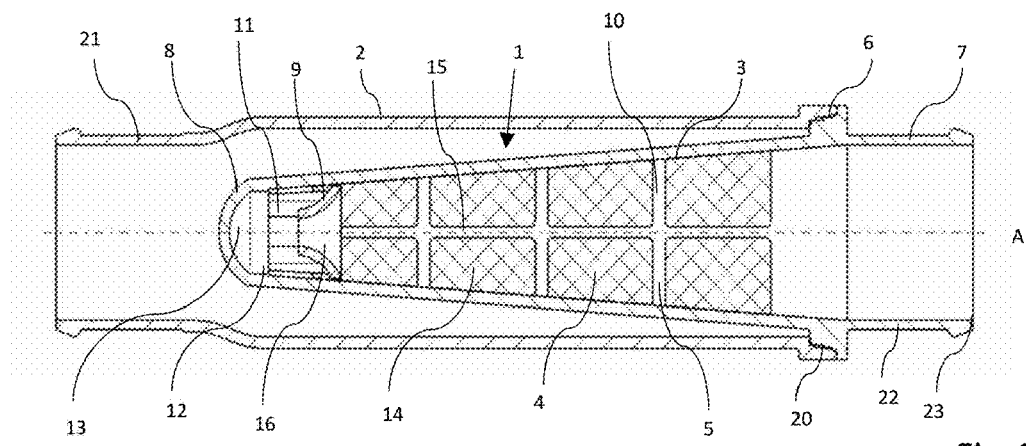
FIG. 2: a lateral sectional view of a first variant of an embodiment of a filter element according to the invention.
Figure 3:
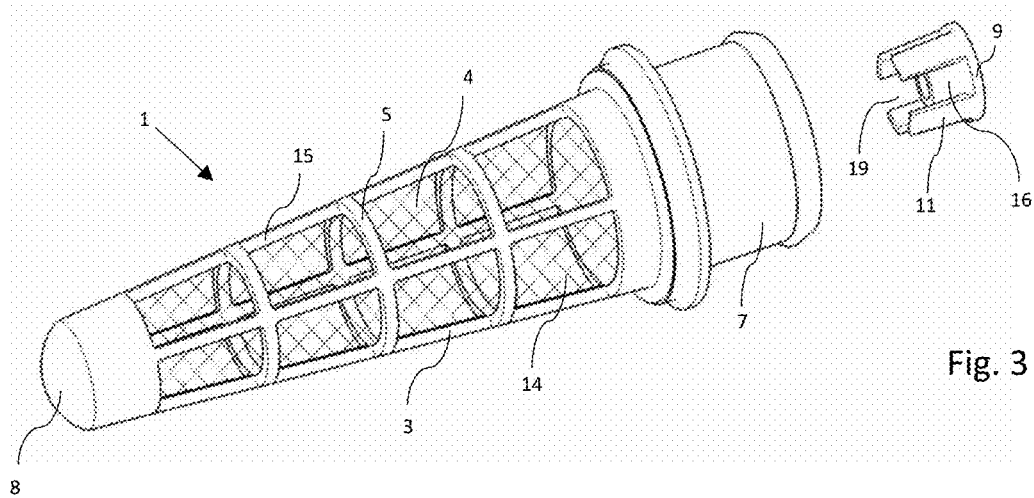
FIG. 3: a perspective view of the filter element with removed flow guidance.
Figure 4:
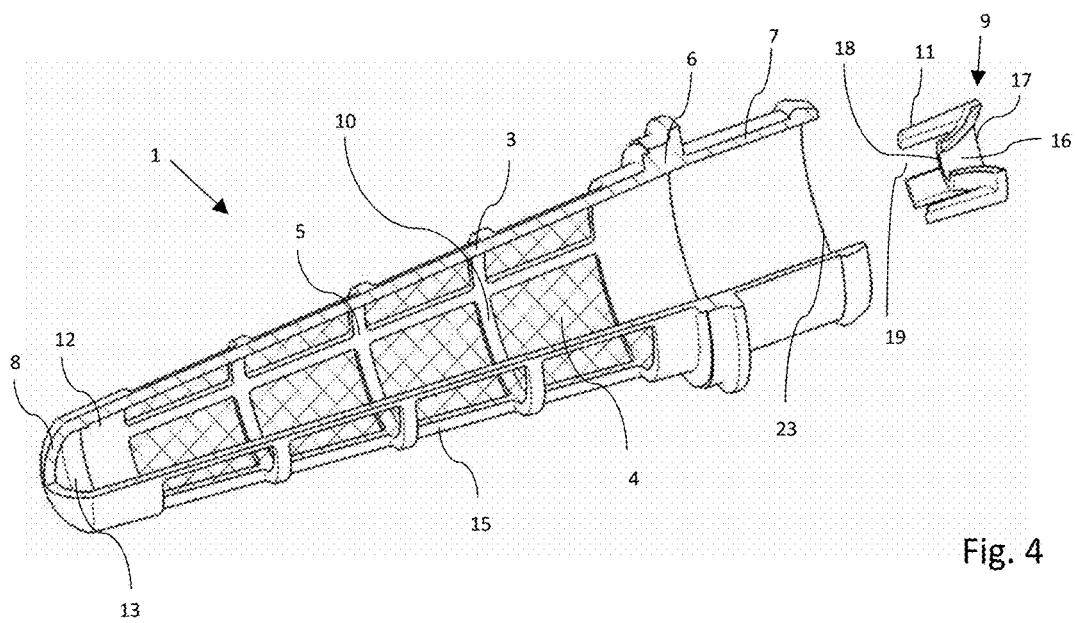
FIG. 4: a perspective sectional view of the filter element with removed flow guidance.
Figure 5:
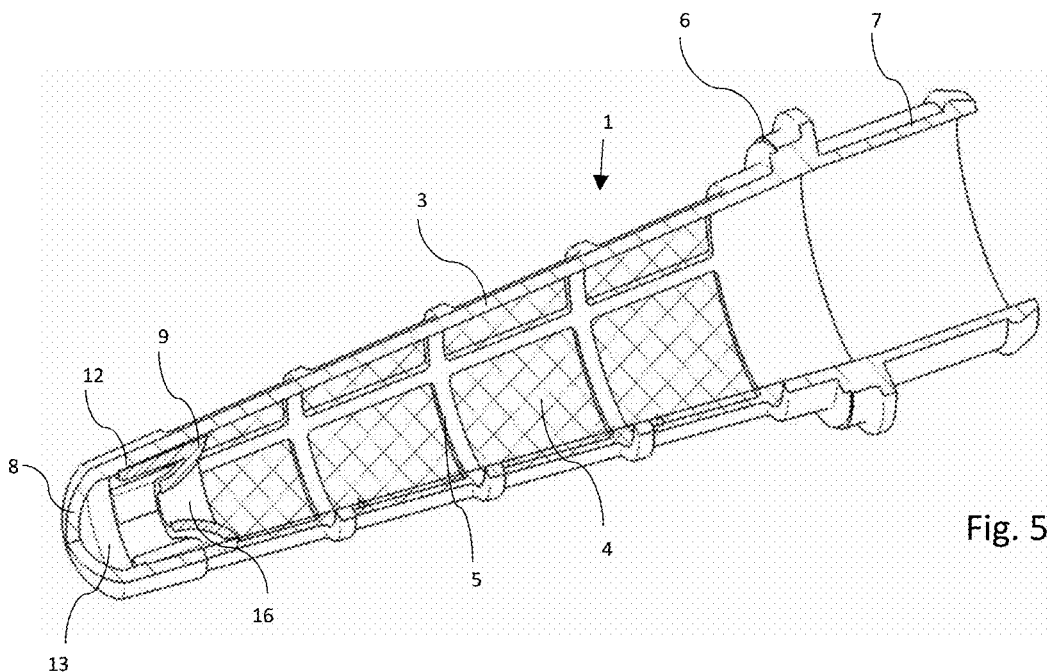
FIG. 5: a perspective sectional view of the filter element with integrated flow guidance.

FIG. 1 shows a cooling circuit 100 for cooling an electrochemical energy converter, preferably in the form of a fuel cell 102 or a stack of several fuel cells. Other electrochemical energy converters can also be cooled in this way. The structure of a fuel cell is known per se. It comprises an anode 104 and a cathode 105 separated by an electrolyte, e.g. a semi-permeable membrane. This semi-permeable membrane can be permeable to protons. Energy is generated by a reaction of hydrogen with oxygen.

The oxygen can be provided by an air inlet 111, e.g. as pure oxygen or as ambient air, or by a liquid medium, e.g. water. The oxygen or air can be moistened with water, for example, before it is fed into the fuel cell 102. To increase the humidity of the gas introduced, e.g. air or oxygen, the cooling circuit features a humidifier 103, which increases the air humidity before introducing it into the fuel cell 102.

In addition to the air inlet 111, the fuel cell 102 features also an inlet for fuel 106, in particular hydrogen. Furthermore, the fuel cell 102 features a supply line 114 for a coolant, e.g. deionized water. The supply line 111 is part of the cooling circuit 100.

The fuel cell 102 features also a discharge line 112 for exhaust gas or exhaust air and a discharge line 115 for the coolant from the fuel cell 102. The discharge line features a three-way valve 113. Depending on the circuit of the three-way valve 113, the coolant can be supplied to a heat exchanger 108 or to a bypass line 107 bypassing the heat exchanger 108. Furthermore, a cooling tank 109 can be provided on the discharge line 115 for the expansion of the coolant, which compensates for temperature-related pressure fluctuations of the coolant. A coolant pump 110 increases the coolant pressure before it is introduced into the fuel cell 102.

The above-mentioned example of an embodiment of a fuel cell 102 and an associated cooling circuit 100 is only to be understood as an example. A hydrocarbon such as alcohols, e.g. methanol or ethanol, can also be used as fuel instead of hydrogen.

A filter element 101, which filters out particulate impurities from the coolant, especially during commissioning or after refilling with coolant, is disposed on the supply line of the coolant to the fuel cell.

Current filter elements used for the application often include a filter medium for depth filtration allowing the dirt contained in the fluid to be filtered out of the coolant or coolant liquid. As a result, the dirt adheres firmly both inside and on the surface of the medium to the fibers located there and thus reduces the free cross-section of the medium above a certain amount of dirt, so that less flow cross-section is available for the volume flow and the pressure loss of the cooling medium due to the filter element increases over the course of time the filter element is in operation.

The filter element according to the invention, for example in the variants of an embodiment of FIGS. 2 to 6 and FIGS. 7 to 8, feature a clearly lower pressure loss over the operating time.

FIGS. 2 to 8 show a first variant of an embodiment of a filter element 1 according to the invention which is arranged in a pipe 2. Pipe 2 has a terminal protrusion 20 for connection to filter element 1. In addition, the pipe 2 features a pipe connection 21 for connecting the pipe 2 to a process line of a cooling circuit, e.g. the cooling circuit 100 of FIG. 1. The connection can be made, for example, by slipping a hose over it and then fastening it using hose clamps.

The filter element 1 features a grid support structure 3 with a cone-shaped course along its longitudinal axis A. The grid support structure 3 defines several grid windows 14 in which the filter medium 4 is disposed. The filter medium 4 is a screen mesh for separating particulate impurities in an interior space 10 of the filter element 1, which is limited by the grid support structure 3.

The grid support structure 3 features an end cap segment 8 closed to the exterior side of the filter element, which is an integral part of the grid support structure 3 in FIGS. 2 to 6. However, it is possible and advantageous to return the cooling medium towards the interior space 10.

The grid support structure 3 features annular struts 5, which extend transversely, in particular vertically, to the longitudinal axis A, and which decrease in ring diameter in the course of the longitudinal axis A towards the end cap segment 8. The annular struts 5 are connected to each other by longitudinal struts 15 and form a circumferential surface with a conical course.

Opposite the closed-wall end cap segment 8, the filter element 1 features at the end a union 7 with a supply opening 23 for connection to a process line of the aforementioned cooling circuit and for supplying coolant to filter element 1. This union 7 extends from an annular closed-wall pipe segment 22. This pipe segment 22 features an annular circumferential projection 6 to the stop and to the circumferential mould closure with the protrusion 20 of pipe 2. The projection 6 can be connected, e.g. by welding, to the protrusion 20 of the pipe 2 in a circumferential material-locking manner.

Between the end cap segment 8 and the pipe segment 22 are disposed the grid windows 14 with the filter medium 4. The end cap segment 8 features stop surfaces 12 for the stop of a flow guidance 9 inserted in the end cap segment 8.

Figure 6:
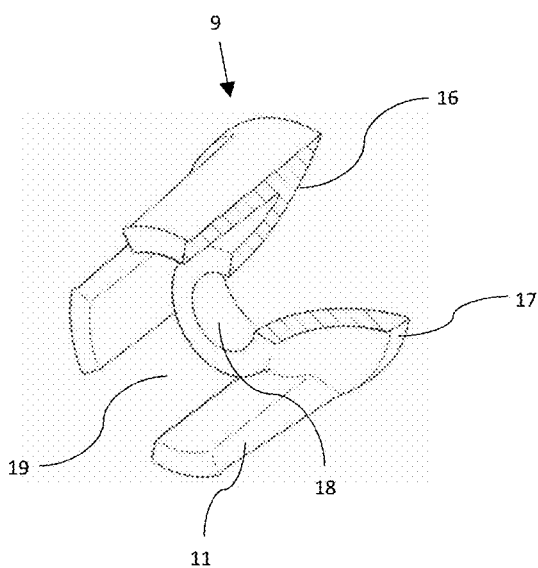
FIG. 6: a perspective sectional view of the flow guidance.

This flow guidance 9 is shown in detail in FIG. 6. It can preferably be disposed detachably in the end cap segment 8. It features a funnel 16 with a funnel axis extending coaxially to the longitudinal axis A of the grid support structure. The funnel features a larger first funnel opening 17 and a smaller second funnel opening 18. The funnel 16 together with the end cap segment 8 defines a collecting chamber 13 to receive the filtered particulate impurities.

The larger funnel opening 17 is disposed in an inlet area of the end cap segment 8 and the smaller funnel opening 18 leads into the collecting chamber 13.

Support members 11, which extend parallel to the funnel axis at the edge of the funnel 16, relative to its radially outer circumferential edge, and which are preferably connected to the funnel 16 in a material-locking manner, are disposed on the funnel 16. In FIGS. 2 to 6, the support members 11 are designed as support feet spaced apart from each other. The gaps 19 between the support feet also serve as backflush openings for the medium to flow out of the collecting chamber 13 while the particles remain in the collecting chamber 13. The support members 11 rest on the stop surfaces 12.

The funnel serves as separation 16 between the collecting chamber 13 for particles or dirt and the actual filter medium 4. This funnel allows the particles arriving in the fluid to enter the collecting chamber in its funnel center and at the same time prevents the particles from being flushed back towards the filter medium 4.

Figure 7:
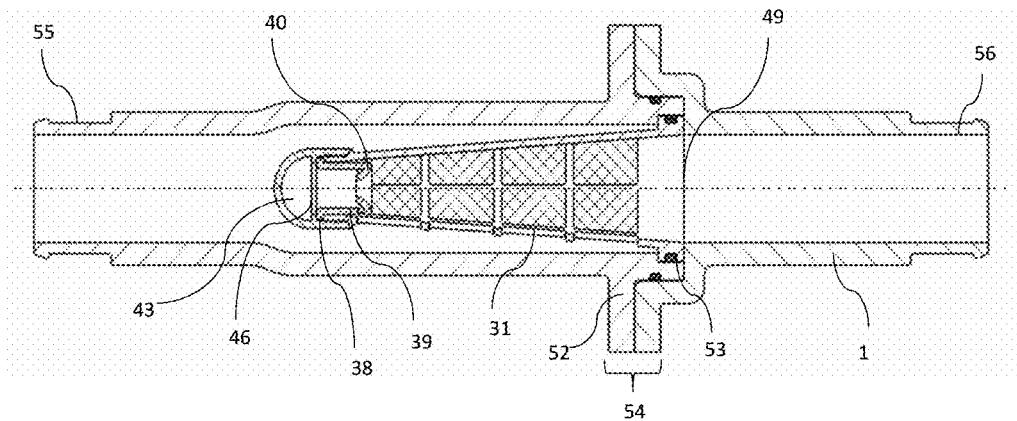
FIG. 7: a sectional view of a second variant of an embodiment of a filter element according to the invention.
Figure 8:
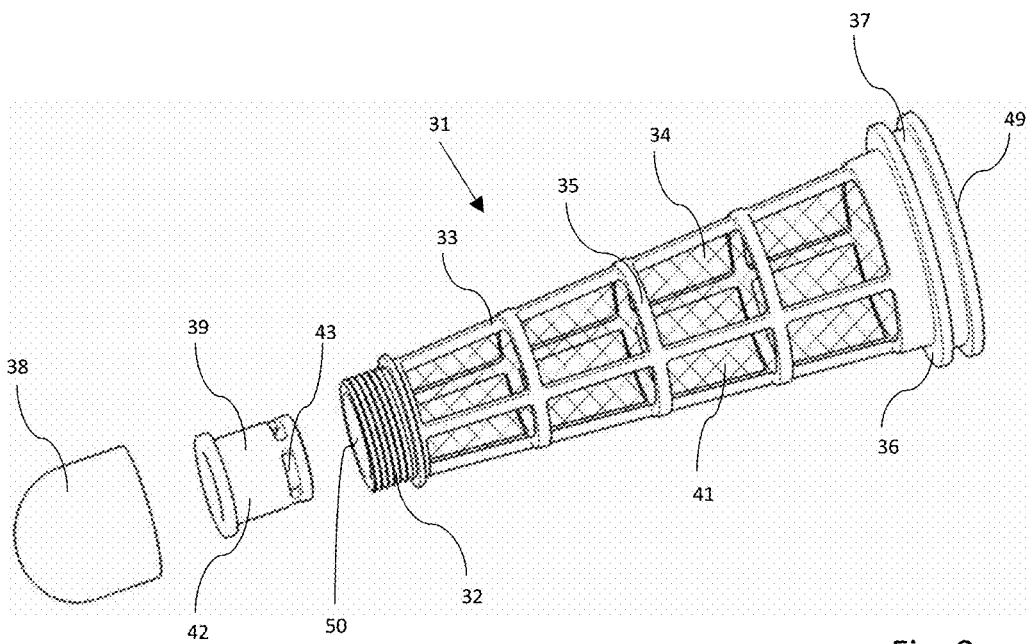
FIG. 8: a perspective view of the filter element of FIG. 7.

FIGS. 7 and 8 feature a second variant of an embodiment of a filter element 31 according to the invention. It is clamped between two pipes 51 and 52, which are connected to each other via a flange connection 54. The flange connection 54 features a first sealing ring 53 for radial sealing. Terminally, i.e. at an opposite end to the flange connection 54, one pipe flange 55, 56 is disposed at each pipe 51, 52 for the connection to a process line.

The filter element 31 itself can be designed in three parts, comprising a grid support structure 33 with a longitudinal axis A with circumferential struts 35, which are connected to each other by longitudinal struts and define a circumferential surface as well as an interior space 41 enclosed by it. In the grid windows of the grid support structure or along the circumferential surface, a filter medium 34, in particular a screen mesh, is disposed.

Terminally, the grid support structure 33 features a closed-wall pipe segment 37 with an annular circumferential projection 36. This projection can feature an annular groove to accommodate a sealing ring for the radial seal, as shown in FIGS. 7 and 8.

The grid support structure 33 is terminally open on one side and features on the other side an interface 32 to an end cap 38, which is detachably disposed on the grid support structure 33. The interface 32 is in this case a screw thread.

The end cap, in conjunction with the grid support structure 33, forms a collecting chamber 43 for particles.

Between the grid support structure 33 and the end cap 38 a flow guide component 39 is disposed, in particular clamped or screwed.

In analogy to FIGS. 2 to 6, this flow guidance also features a funnel 40, which enables dirt to be discharged towards the collecting chamber.

The grid support structure 33 features a supply opening 49 into the filter element 31 and a discharge opening at the transition to the flow guidance 39. Preferably, the diameter of the supply opening 49 is at least twice as large as the diameter of the discharge opening 50.

The funnel 40 features a circumferential cylindrical support member 42 at the edge, which can support itself on a stop surface 46 of the end cap 38 against axial displacement in the mounted state.

The support member 42 features return flow openings 43 at the edge, which serve to return the medium flowing in through the funnel 40, while the particles remain in the collecting chamber 43. Accordingly, the return flow openings 43 should be advantageously at least smaller than the inflow opening of the funnel 40.

In FIGS. 2 to 8, the funnel 16, 40 features an inwardly rounded shape, which has additional fluidic advantages.

The funnel 16, 40 shown in FIGS. 2 to 8 can, for example, feature an inlet diameter of 35-45 mm and an outlet diameter of 20-30 mm for the exit into the collecting chamber 13, 43. The inlet diameter is particularly preferably to be at least 20%, preferably at least 25% larger than the outlet diameter.

The internal diameter of the end cap or end cap segment can be between 40-50 mm. It is advantageously at least 30% larger than the outlet diameter.

The length of the filter element 1, 31 can preferably be between 100 mm and 230 mm, preferably between 130 mm and 200 mm.

The supply opening 49 into the filter element 31 and in analogy also the supply opening 23 for the filter element 1 can preferably feature a diameter between 14 and 20 mm, preferably between 15 and 18 mm.

The filter medium 4, 34 can be particularly preferably designed as screen mesh, preferably made of stainless steel, e.g. high-grade steel. The average mesh width of the filter medium, in particular of the screen mesh, can preferably be more than 70 μm, in particular between 80 and 150 μm, in particular between 100 and 120 μm.

FIGS. 2 to 8 show only two preferred design variants of an embodiment. It is also conceivable that the funnel is part of the filter medium 4, 34, which can be inserted as a separate component of the filter element into the grid support structure.

The filter elements shown in FIGS. 2 to 8 each provide a collecting chamber 13, 43 for the dirt which is located outside the flow cross-section and thus does not restrict it. Thus, more dirt can be filtered out than with a conventional filter medium. An increase in pressure during operation does not occur or occurs only to a very small extent.

This means that a relatively large dirt capacity can be made available in a smaller installation space with relatively little filtration area. In addition, the mesh used as screen mesh without depth filtration offers an advantage in pressure loss for the high volume flows that can occur in a cooling circuit of an electrochemical energy converter, for example in the 250 l/min range.

The conical shape of the filter is also advantageous for the dirt particles. They slide along the mesh and then are flushed into the collecting chamber, in addition to the particles that have already reached it directly.

What is claimed is:

1. A conical particulate filter element comprising:
   a conically shaped grid support structure tapering from a first open end to a second end, and defining an interior space;
   a filter medium fixedly supported by said conically shaped grid support structure;
   a collection chamber disposed at, and closing, said second end of said of said conically shaped grid support structure; and
   a funnel having a solid frustoconical sidewall with openings at either end, is disposed within said interior space and positioned to direct particulate through said funnel and into said collection chamber;
   wherein a fluid to be filtered is introduced into said interior space through said open end, with particulates above a predetermined size being prevented from passing through said filter medium, and at least some particulates entering said funnel and being directed into said collection chamber.

2. The conical particulate filter element according to claim 1, wherein the filter medium is a screen mesh selected from the group consisting of: a metal mesh or a steel screen mesh.

3. The conical particulate filter element according to claim 2, wherein an average mesh width of the screen mesh is between 70 μm and 120 μm.

4. The conical particulate filter element according to claim 1, wherein the collection chamber is within an end cap or an end cap segment.

5. The conical particulate filter element according to claim 4, wherein the end cap or end cap segment is integrally formed with said conically shaped grid support structure.

6. The conical particulate filter element according to claim 4, wherein the end cap or end cap segment is detachably connected with said conically shaped grid support structure.

7. The conical particulate filter element according to claim 6, wherein the end cap or end cap segment is threadably connected to said conically shaped grid support structure.

8. The conical particulate filter element according to claim 1, wherein the funnel consists of a plastic material.

9. The conical particulate filter element according to claim 1, wherein the funnel includes at least one support member extending downwardly from its radially outer circumferential edge and substantially parallel to a central longitudinal axis of said funnel.

10. The conical particulate filter element according to claim 9, wherein said at least one support member comprises a plurality of support feet spaced apart from each other.

11. The conical particulate filter element according to claim 9, wherein said at least one support member comprises a cylinder.

12. The conical particulate filter element according to claim 11, wherein said cylinder includes at least one return flow opening, which serves to return any fluid flowing into the collection chamber through the funnel back to the interior space, while particles remain in the collecting chamber.

13. The conical particulate filter element according to claim 1, wherein said funnel openings include a first inlet opening having an inlet diameter and a second outlet opening having an outlet diameter; wherein the inlet diameter is at least 20% larger than the outlet diameter.

14. The conical particulate filter element according to claim 1, wherein the screen mesh is encapsulated and/or over-molded with a material of the grid support structure.

\* \* \* \* \*